United States Patent [19]

Stewart, Sr.

[11] Patent Number: 5,061,869
[45] Date of Patent: Oct. 29, 1991

[54] MOTOR HOUSING STRUCTURE

[75] Inventor: Kenneth W. Stewart, Sr., Columbus, Miss.

[73] Assignee: United Technologies Electro Systems, Inc., Columbus, Miss.

[21] Appl. No.: 32,844

[22] Filed: Apr. 1, 1987

[51] Int. Cl.$^5$ .............................................. H02K 5/00
[52] U.S. Cl. ....................................... 310/89; 310/42; 310/91; 411/517; 411/999
[58] Field of Search ..................... 310/89, 91, 258, 42; 248/637, 674; 411/352, 353, 999, 517, 519

[56] References Cited

U.S. PATENT DOCUMENTS

| | | | |
|---|---|---|---|
| 1,115,947 | 11/1914 | Lincoln | 310/258 |
| 1,611,942 | 12/1926 | Persons | 310/258 |
| 1,771,475 | 7/1930 | Wright | 310/258 |
| 2,616,733 | 11/1952 | Strange | 411/352 |
| 3,683,221 | 8/1972 | Konovalov | 310/258 |
| 4,615,655 | 10/1986 | Dixon | 411/353 |

FOREIGN PATENT DOCUMENTS

| | | | |
|---|---|---|---|
| 0115962 | 9/1942 | Australia | 310/674 |
| 0104247 | 4/1966 | Denmark | 310/258 |
| 2806971 | 8/1979 | Fed. Rep. of Germany | 310/258 |
| 0060438 | 8/1947 | Netherlands | 310/258 |
| 2157786 | 10/1985 | United Kingdom | 411/353 |

*Primary Examiner*—R. Skudy

[57] ABSTRACT

A method of assembling a motor to an object, a motor housing, and an electric motor are disclosed, each of which uses a hollow fastener to secure the motor housing to form an integral unit. Thru bolts are retained within the hollow fastener such that the thru bolts may thereafter be utilized to mount the motor to another object without requiring disassembly of the motor. Additionally disclosed are retainers for securing the thru bolts within the fastener during those time periods between motor assembly and assembly of the motor to an object to which it is to be mounted.

5 Claims, 1 Drawing Sheet

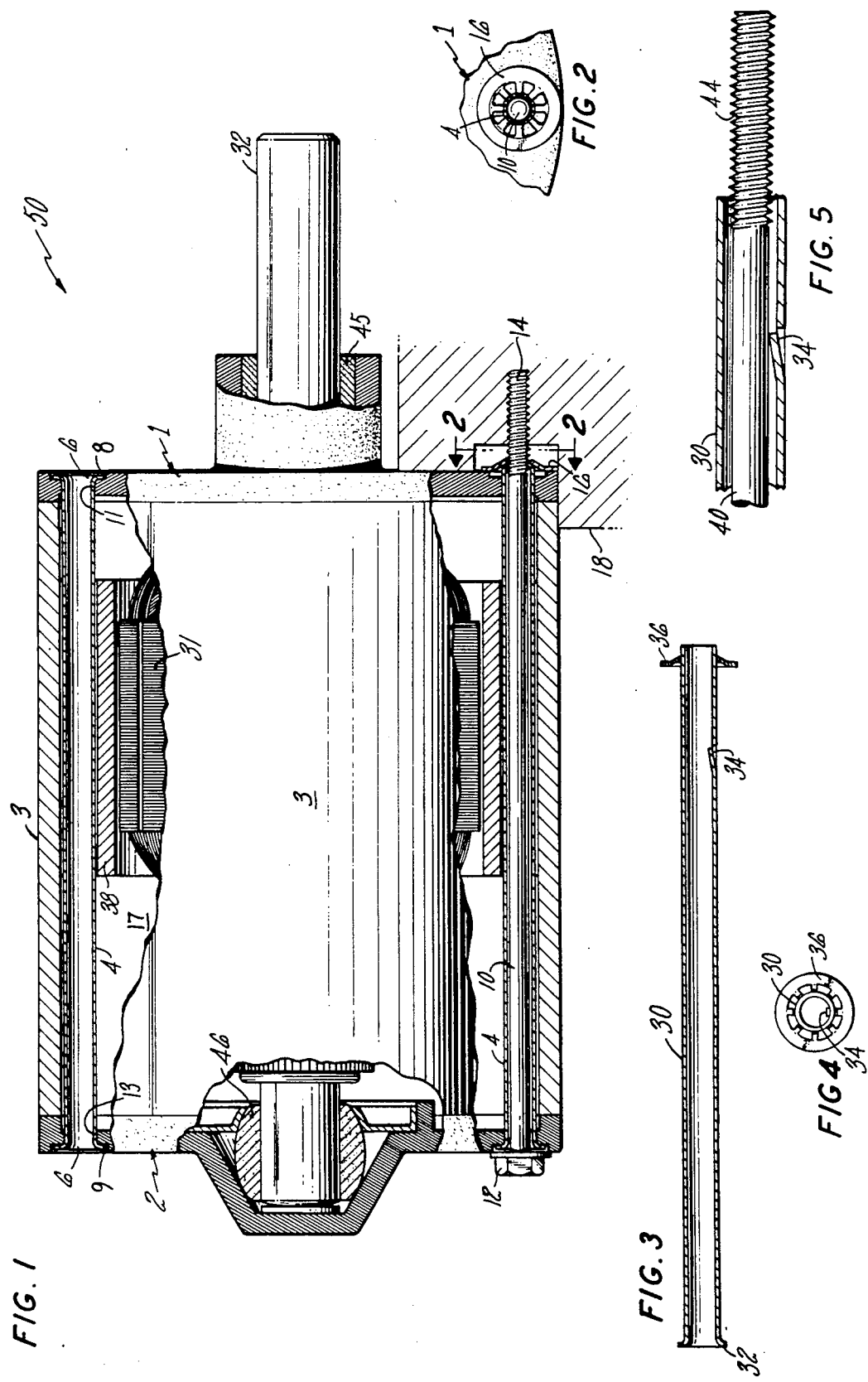

MOTOR HOUSING STRUCTURE

BACKGROUND OF THE INVENTION

The present invention is directed to an improved apparatus and method for assembling a motor housing and for thereafter assembling the motor to another object. More particularly, the present invention is directed to utilizing a hollow fastener for securing the end caps of a motor to form a motor housing and the use of a thru bolt extending through the hollow fastener to secure the motor to an object to which it is mounted.

A conventional electric motor has a pair of end caps and a cylindrical shell which collectively define a motor housing. Typically, thru bolts extend through one end cap, through space defined within the shell and through the other end cap. The bolts are tightened and the shell is secured between the end caps to form the housing for the motor.

The motor is often shipped in this configuration with the thru bolts tightened to secure the housing. The end user of the motor may desire to mount the motor to an object such as an object which is to be driven by the motor, a mounting block, or other apparatus. To accomplish this mounting, often the thru bolts extending through the motor are utilized. These thru bolts are often either loosened or removed entirely from the motor to allow the motor to be mounted to the desired end use. However, as a result of loosening these end bolts or removing them from the motor, a potential for misalignment of the motor components upon reassembly of the motor is created. The end cap may be loosened and moved relative to the shell, and upon reassembly, damage may occur in the motor. The necessity to verify proper alignment upon reassembly of the motor additionally adds to the installation costs when mounting the motor to an object.

The herein invention is directed to utilizing a tubular rivet to secure end caps and a shell of an electric motor to form a housing. Thru bolts may then extend through the tubular rivet and may be loosened or tightened to mount the motor to an end object. Since the thru bolts do not secure the end caps of the motor to each other, the removal, disengagement or tightening of the thru bolts will not affect the integrity of the motor. Additionally, the installer can simply mount the motor to the object without worrying about realigning the motor after it has been physically loosened by the removal of the thru bolts.

SUMMARY OF THE INVENTION

It is an object of the present invention to provide means for securing the housing of an electric motor.

It is another object of the present invention to provide means for securing the housing of an electric motor which additionally defines a central opening for allowing a thru bolt to be secured therein.

It is a further object of the present invention to provide an electric motor assembly having a thru bolt retained within the assembly while allowing the thru bolt to rotate therewithin for the purpose of engaging a motor to an object to which it is to be mounted.

Another object of the present invention is to provide a method of assembly of a motor wherein an electric motor is engaged to an object to which it is mounted at a time other than when the motor is physically assembled.

A further object of the present invention is to provide a motor having enhanced quality and integrity since manipulation of the thru bolts will not affect the alignment or structure of the motor per se.

It is a still further object of the present invention to provide a safe, economical, and reliable motor.

It is a yet further object of the present invention to provide a method of assembly of a motor and the motor to a final object which is reliable, protects the integrity of the motor, is economical and otherwise of commercial advantage.

Other objects will be apparent from the description to follow and the appended claims.

The above objects are achieved according to a preferred embodiment by the provision of a motor housing for an electric motor which includes a first end cap having at least one fastener opening extending therethrough, a second end cap having at least one fastener opening extending therethrough, a circumferentially extending shell defining an interior space and being positioned between the first end cap and the second end cap, and hollow securing means extending within the space defined by the shell from the fastener opening of the first end cap to the fastener opening of the second end cap, said securing means securing the first end cap to the shell and the shell to the second end cap to provide a motor housing, and said hollow securing means defining a longitudinally extending central opening extending from the fastener opening of the first end cap to the fastener opening of the second end cap. A thru bolt means may be mounted to extend through the fastener opening and retainer means may be provided for securing the thru bolt means within the fastener opening.

Additionally disclosed is an electric motor which includes a housing having a first end cap, a second end cap, and a circumferentially extending shell defining interior space; electrical components located within the space; and means for securing the first end cap to one end of the shell, the second end cap to the other end of the shell, and said means defining a central opening extending through the housing, said central opening being positioned to allow passage of a fastening means through the housing.

Further disclosed is a method for manufacturing a motor assembly including an electric motor being secured to an object at a time other than simultaneously with the assembly of the motor. The method includes the steps of assembling an electric motor having a securing means to fasten various portions of the motor to each other, said securing means defining an opening extending through the motor; retaining thru bolt means within the securing means to prevent inadvertent removal of the thru bolt means from the electric motor; and engaging the thru bolt means with the object to secure the motor to the object.

BRIEF DESCRIPTION OF THE DRAWINGS

FIG. 1 is a sectional view of an electric motor.

FIG. 2 is a partial end view of a portion of an electric motor taken at line II—II in FIG. 1.

FIG. 3 is a sectional view of a swaged tube with a push-on fastener.

FIG. 4 is an end view of FIG. 3 showing the end of the swaged tube and the fastener.

FIG. 5 is a partial, enlarged view of a portion of the swaged tube showing an inwardly extending tang and the thru bolt mounted therewithin.

PREFERRED EMBODIMENT OF THE INVENTION

The invention herein will be described with reference to a specific electric motor. It is to be understood that the herein invention has general applicability to electric motors and housings of various configurations. For the purposes of the herein disclosure, the armature, shaft, field windings, commutator and other various electrical components of the motor have been referenced for the sake of clarity. It is to be understood that any conventional electrical components for such a motor would be applicable hereto.

Referring to FIG. 1, there may be seen a sectional view of electric motor 50. The top half of the view shows tubular rivet 4 securing the end caps together. The bottom half of the view additionally shows a thru bolt inserted within the tubular rivet and the thru bolt engaged to an object to which the motor is mounted.

Specifically, the motor has end caps 1 and 2 located at either end thereof and cylindrical shell 3 extending thereabout. The cylindrical shell defines an interior space 17 in which the various electrical components of the motor are mounted. Armature 31 mounted on shaft 32 is shown located within space 17 as are magnets 38. It is obvious that various electrical components, such as commutators, windings and other typical components of an electric motor may be secured therewithin.

End cap 1 defines an opening 11 extending therethrough and recess 8 having a greater diameter than opening 11. End cap 1 additionally defines an unreferenced opening in which bearing 45 is mounted to secure shaft 32. Bearing 46 is secured to end cap 2 to secure the other end of shaft 32. End cap 2 likewise defines opening 13 extending therethrough and recess 9. Again, recess 9 has a larger diameter than opening 13.

Tubular rivet 4 is shown extending between end caps 1 and 2 and includes flared end 6 of greater diameter than opening 11, but of lesser diameter than recess 8 located at one end, and a second flared end 6 having greater diameter than opening 13, but of lesser diameter than recess 9 located at the opposite end. Typically, a tubular rivet having one flared end is inserted through one end cap, through the interior spaced defined by the shell and through the other end cap. The other end of the tubular rivet is then spun or riveted over into the flared configuration shown such that the two end caps are secured with the shell therebetween to form the motor housing.

Looking to the bottom half of FIG. 1, it can be seen that thru bolt 10 is inserted within the tubular rivet through the central axially extending opening in tubular rivet 4 such that bolt head 12 engages the exterior surface of end cap 2 and bolt threads 14 extend beyond the exterior surface of end cap 1. Retainer 16 is shown mounted to the bolt thread portion of the bolt to secure thru bolt 10 to the electric motor. Retainer 16 is a typical push-on retainer which prevents inadvertent removal of thru bolt 10 from the motor while allowing thru bolt 10 to be rotated for later engagement with an object to which the motor is to be secured.

Additionally shown in FIG. 1 is object 18 which may be any object to which it is desired to mount the motor. It may typically be a driven member, a gear housing, a mounting block or other apparatus to which it is desired to secure the motor. As shown in FIG. 1, bolt threads 14 threadably engage object 18 to secure the bolt to the object and to thereby secure the motor to the object. In this manner, the thru bolt may be threadably secured to the object while being allowed to rotate relative to the tubular rivet. Hence, the engagement of thru bolt 10 with object 18 is made independently from the means for securing the two end caps and shell to form the motor housing. In this manner, the integrity of the motor housing, as initially assembled, is maintained notwithstanding the use of thru bolts to secure the motor to an object.

FIG. 2 is an end view of a portion of FIG. 1 taken at line II—II showing thru bolt 10, end cap 1, and retainer 16. Retainer 16 is shown as a typical push-on retainer which loosely engages bolt threads 14 to secure thru bolt 10 to the motor.

It is anticipated that in applications where the thru bolt is held by a retainer (such as shown in FIG. 2) during shipment, the retainer could be fabricated from a fiberboard material that possesses a degree of rigidity. The retainer, preferably, has a small center hole and has radial inwardly projecting fingers which the thru bolt displaces as the retainer is placed onto the thru bolt. The fingers of the retainer hang on to the threads of the thru bolt and, thereby, loosely retain the thru bolt in the tubular rivet during shipment. At the time the motor is to be installed, each of the thru bolts can simply be grasped by the head and pulled outwardly, thereby stripping the fiber retainer from the opposite end of the thru bolts and allowing the thru bolts to be free and in position for securing the motor to the object. The fiber retainer is simply discarded as it is no longer needed.

FIG. 3 discloses a swaged tube 30 having a flared end 32. This swaged tube may be inserted through the appropriate end caps as shown in FIG. 1. Swaged tube 30 has no end treatment at the opposite end from flared end 32 and is secured to the end cap by push-on fastener 36 instead of flaring the end of the tube to engage the end cap. This fastener may be Truarc push-on fastener number 5105-24 or any external push-on type retaining ring. Other push-on type retaining rings include model no. 5105-25 sold by Truarc Retaining Rings Division, Waldes Kohinoor, Inc., Long Island, N.Y. 11101 and model no. 6100-25 sold by Industrial Retaining Ring Co., Irvington, N.J. 07111. This push-on fastener acts to secure the end cap to the shell much in the manner that flared end 6 of tubular rivet 4 secures the end cap to the shell. Hence, in the embodiment shown in FIG. 3, one flared end and one push-on fastener are used instead of the two flared ends as shown in FIG. 1.

FIG. 4 is an end view of the swaged tube and fastener of FIG. 3. Tube 30 is shown having push-on fastener 36 mounted thereabout.

FIG. 3 additionally discloses tang 34 extending inwardly from the cylindrical wall of the swaged tube 30. FIG. 5 shows an enlarged view of swaged tube 30 having a threaded thru bolt secured therewithin and showing that the tang extends inwardly to engage the exterior surface of the threaded bolt. Since bolt threads 44 of thru bolt 40 as shown therein have a larger diameter than the remainder of the bolt, it can be seen that inwardly extending tang 34 from swaged tube 30 acts to prevent the threaded portion of the bolt from passing by the inwardly extending tang. In this manner, the thru bolt is retained within the swaged tube.

In order to assemble or manufacture the motor using the herein described invention, the various motor components are assembled including using a tubular rivet to secure the end caps and shell to form a motor housing. The motor manufacturer may then insert thru bolts into the tubular rivet and provide means for retaining the thru bolts in position. The motor manufacturer may at some future time, or a purchaser of the motor may at some future time, thereafter assemble the motor to an end use or an object to which it is mounted. At that time, the thru bolts may be readily utilized to mount the motor to said objects since the bolts are retained in position while allowing the bolts to be rotated to obtain threadable engagement with the object to which the motor is to be mounted. Other types of fastening with a securing means extending through the tubular rivets might be as readily utilized.

By the use of this method, it may be seen that the structural integrity of the motor is maintained notwithstanding the use of thru bolts to mount the motor to another object. It is not necessary to loosen the motor housing to make the thru bolts available for other functions since the motor housing remains fixed by the use of the tubular rivets to secure the end caps to the shell.

The invention has been described with reference to particular embodiments, however, it is to be understood by those skilled in the art that variations and modifications can be effected within the spirit and scope of the invention.

I claim:

1. A motor housing for an electric motor which comprises:
    a first end cap having at least one fastener opening extending therethrough;
    a second end cap having at least one fastener opening extending therethrough;
    a circumferentially extending shell defining an interior space and positioned between the first end cap and the second end cap;
    hollow securing means extending within the space defined by the shell from the fastener opening of the first end cap to the fastener opening of the second end cap, said securing means affixedly securing the first end cap to the shell and the shell to the second end cap, said hollow securing means defining a longitudinally extending central opening extending from the fastener openings of the first end cap to the fastener openings of the second end cap;
    thru bolt means extending through the fastener opening in the first end cap, through the hollow securing means and through the fastener opening in the second end cap; and retainer means for preventing the thru bolt means from being inadvertently removed from the hollow securing means without limiting rotation of the thru bolt means.

2. The apparatus as set forth in claim 1 wherein the retainer means comprises a snap on retainer press fit onto the thru bolt means, said thru bolt means having a bolt head larger that the fastener opening in the first end cap and said snap on retainer having a larger diameter than the fastener opening in the second end cap whereby removal of the thru bolt means from the housing is prevented.

3. The apparatus as set forth in claim 1 wherein the retainer means comprises:
    a tang portion formed from the hollow securing means, said tang portion extending into the longitudinally extending central opening to engage the thru bolt means to prevent inadvertent removal of the thru bolt means from the hollow securing means.

4. The apparatus as set forth in claim 1 wherein said hollow securing means further comprises at least one flared end portion having a larger diameter than an end cap fastener opening.

5. An electric motor mounted to another object comprising:
    a housing including:
    a first end cap;
    a second end cap; and
    a circumferentially extending shell defining an interior space;
    electrical components located within the space; means for affixedly securing the first end cap to one end of the shell, the second end cap to the other end of the shell, and said means defining a central opening extending through the housing, said central opening being positioned to allow passage of a fastener through the housing;
    a fastener extending through the central opening defined by the means for securing, said fastener upon assembly acting to secure the motor to said another object; and
    retaining means for securing the fastener within the means for securing before the fastener secures the motor to said another object.

* * * * *